United States Patent [19]

Trotta

[11] 4,255,117
[45] Mar. 10, 1981

[54] HEAT SOURCE FOR FOOD WARMING UNIT

[76] Inventor: Richard L. Trotta, 1109 Timberlea Dr., Bel Air, Md. 21014

[21] Appl. No.: 942,810

[22] Filed: Sep. 15, 1978

[51] Int. Cl.³ .............................................. F23D 3/26
[52] U.S. Cl. ..................................... 431/34; 431/326; 126/43
[58] Field of Search ................... 431/33, 34, 326, 203; 126/43

[56] References Cited

U.S. PATENT DOCUMENTS

| 272,387 | 2/1883 | Marshall | 126/266 |
|---|---|---|---|
| 651,952 | 6/1900 | Pearlstine | 126/265 |
| 690,519 | 1/1902 | Gartrell | 126/266 |
| 810,730 | 1/1906 | Drear | 126/266 |
| 821,795 | 5/1906 | Gerlach | 126/266 |
| 905,543 | 12/1908 | Kovacic | 431/34 |
| 1,232,227 | 7/1917 | Corbitt | 126/266 |
| 2,804,132 | 8/1957 | Mallory | 431/203 |
| 3,171,398 | 3/1965 | Lawson | 126/49 |
| 3,316,957 | 5/1967 | Stockli et al. | 431/203 |
| 3,342,174 | 9/1967 | Tongue et al. | 431/34 |

Primary Examiner—Carroll B. Dority, Jr.
Attorney, Agent, or Firm—Saidman & Sterne

[57] ABSTRACT

A heat source which is particularly adapted to be utilized for a food warming unit or the like. The heat source includes a fuel tank which is adapted to be filled with a liquid fuel and includes a recessed chamber with one or a plurality of burner units disposed therein. Associated with the recessed chamber is a spring-loaded, hinged cover which is adapted to be automatically released to extinguish the burners upon certain disturbances to the fuel tank, such as by being tipped over, lifted, or dropped. The unit also features a unique burner construction which greatly reduces costs compared with known heat sources.

13 Claims, 5 Drawing Figures

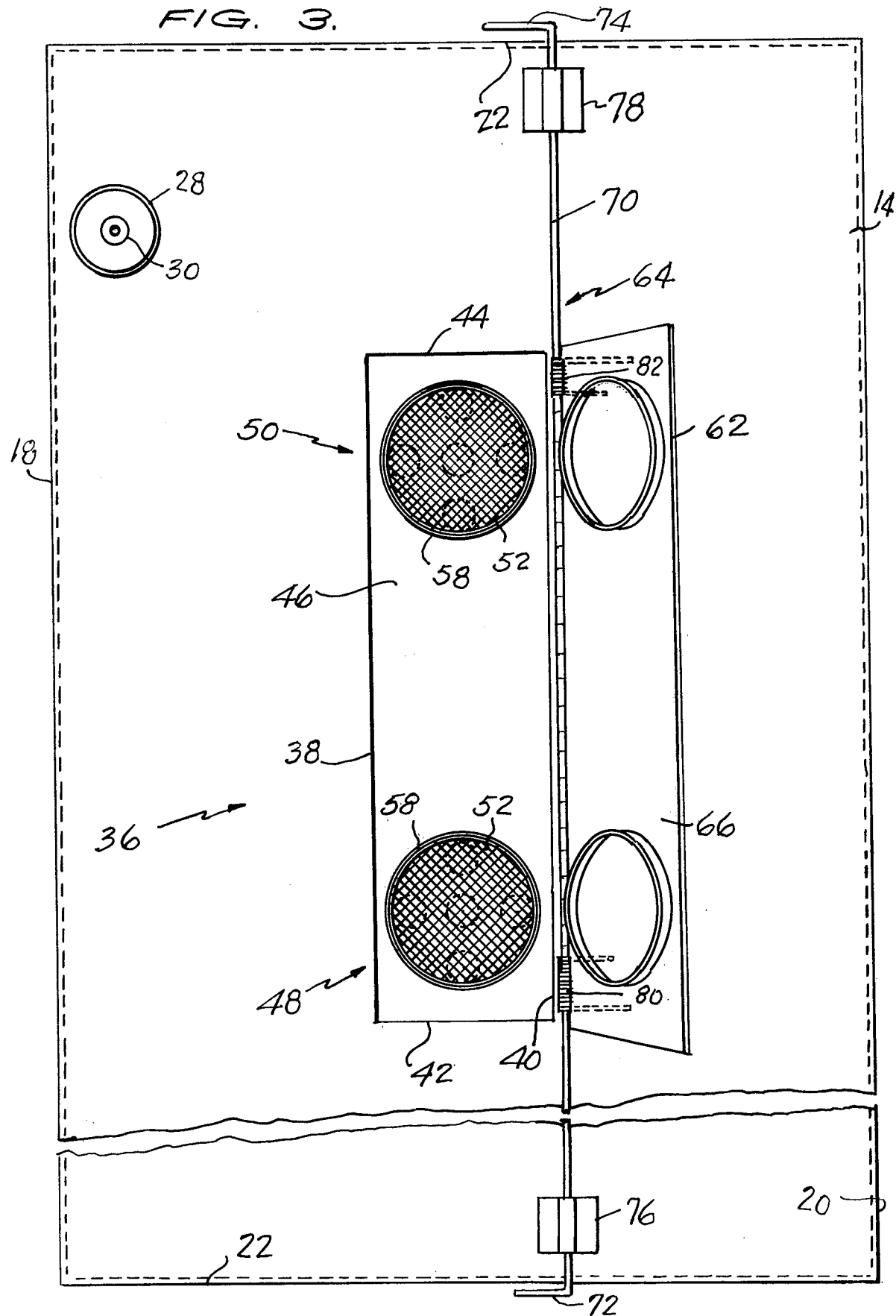

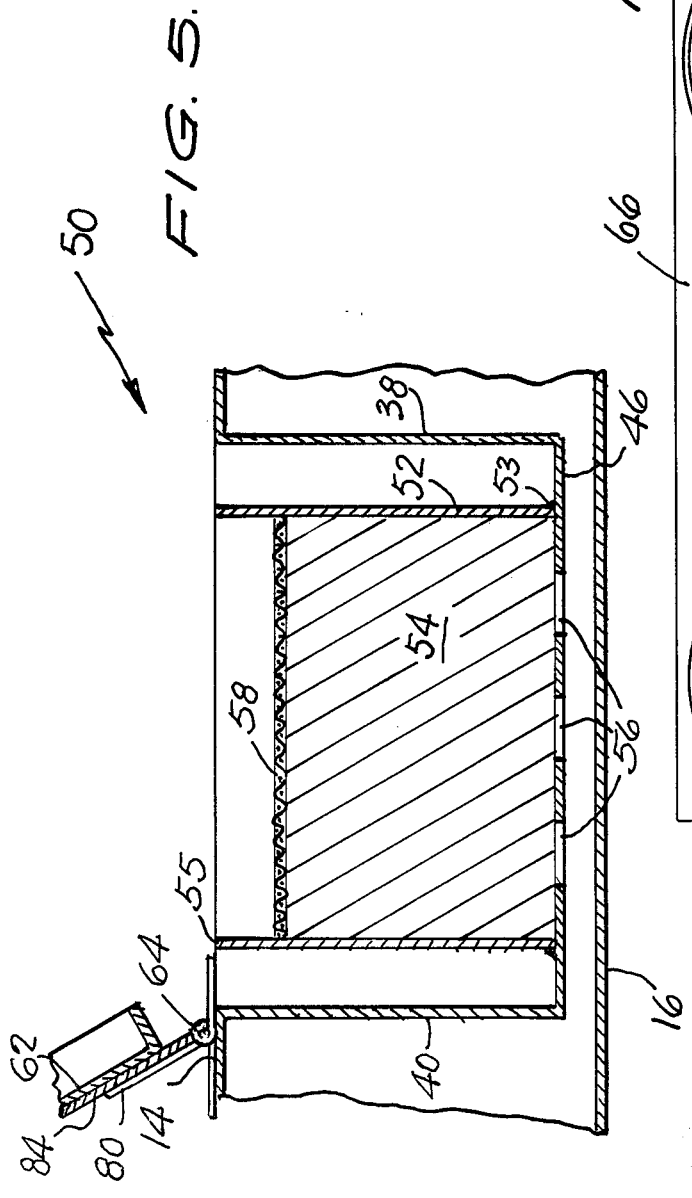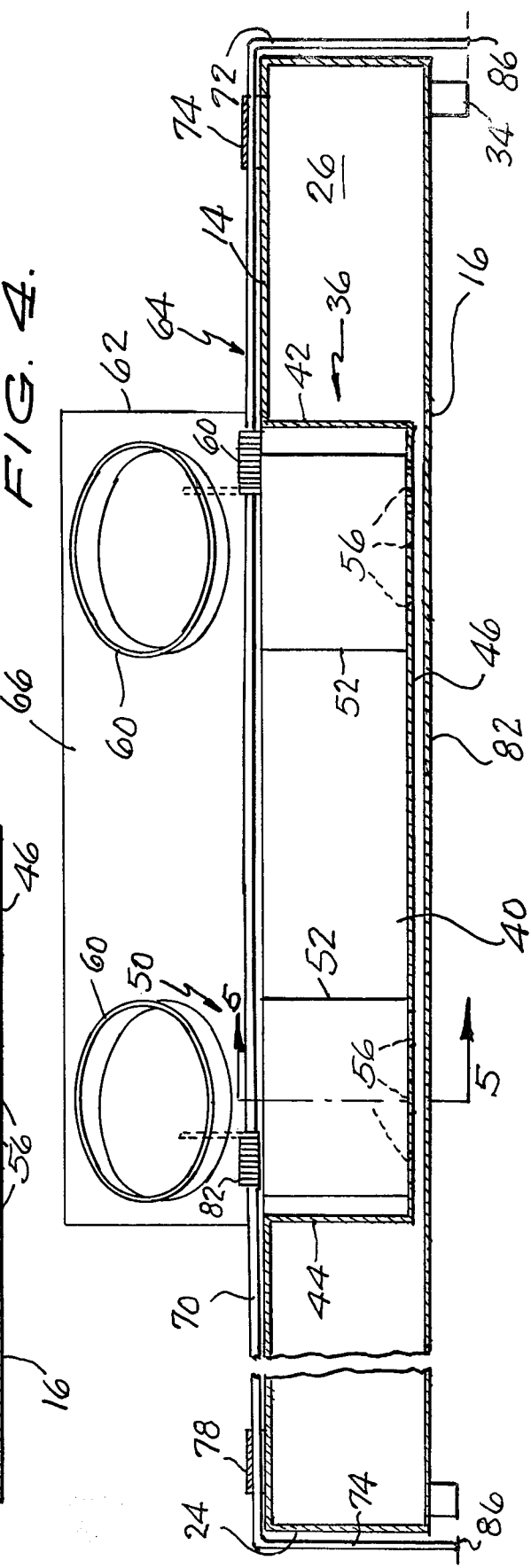

HEAT SOURCE FOR FOOD WARMING UNIT

BACKGROUND OF THE INVENTION

1. Field of the Invention

The present invention is related to heat sources and, more particularly, is directed towards the type of heat source which is particularly adapted to be utilized with food warming or similar units.

2. Description of the Prior Art

Food warming units are well known in the art. They are most familiarly utilized in conjunction with buffet style food serving, such as those supplied by caterers, cafeterias, and the like.

Such food warming units rely upon various sources of heat to maintain the desired temperatures of the food being served. One form of heat source frequently utilized is generally known as canned heat, which consists of prepackaged cans that are filled with solid or jellied fuels. Such forms of heat sources are disadvantageous in that, being of limited capacity, they must be frequently replaced as the fuel is burned up. In addition to the high cost of the throw-away cans and the fuels, such canned heat is difficult to handle and somewhat messy. An empty can whose fuel has been spent is hot, and therefore some hazard is present in removing the can and replacing it with a fresh can. Further, the fresh can must be reignited, which further complicates the handling procedure.

I have also found that the prior art food warming units which utilize canned heat or other types of heat source lack sufficient safety features. In the event that the food warming unit or its associated heat source is distributed by, for example, being knocked over, no means exist in the prior art devices for extinguishing the flame and preventing a possible fire.

It is towards these ends that the present invention is advanced. I am aware of the following U.S. patents which are generally related to this art: U.S. Pat. Nos. 272,387; 651,952; 690,519; 810,730; 821,795; 1,232,227; and 3,171,398.

OBJECTS AND SUMMARY OF THE INVENTION

It is therefore a primary object of the present invention to provide a heat source for a food warming or similar unit which overcomes all of the disadvantages noted above with respect to prior art devices.

Another object of the present invention is to provide a novel and unique heat source for a food warming or similar unit which does not require frequent replenishment or replacement of fuel.

A further object of the present invention is to provide a heat source which is adapted to be utilized in conjunction with a food warming or similar unit which obviates the need for throw-away canned heat, and thereby substantially reduces costs when compared with prior art devices.

An additional object of the present invention is to provide a novel heat source for a food warming or similar unit which is far easier to handle than prior art devices in that it eliminates the necessity of discarding hot, empty fuel cans and the general messiness associated with canned heat.

A still further object of the present invention is to provide a unique and novel heat source which is particularly intended to be utilized with buffet style food warming units and which includes a safety feature which automatically extinguishes the flame of the heat source if the unit is disturbed as by being tipped over, dropped, or lifted.

Another object of the present invention is to provide a novel and unique heat source for a food warming or similar unit which is economical to produce, uses a minimum of parts, may be constructed of readily available components, and which provides safety features which have been heretofore unavailable.

The foregoing and other objects are attained in accordance with one aspect of the present invention through the provision of a heat source for a food warming or similar unit which comprises means for containing a liquid fuel, burner means connected to the containing means and in communication with the liquid fuel, and means for automatically extinguishing the burner means upon disturbance of the containing means.

More particularly, the containing means comprises a fuel tank including a top wall, a bottom wall, side walls, end walls and means providing access to the interior of the tank for filling same with liquid fuel. The fuel tank further comprises a recessed chamber extending downwardly from the top wall thereof, the burner means being disposed in the recessed chamber.

In accordance with more specific aspects of the present invention, the means for automatically extinguishing the burner means preferably comprises a lid hingedly or pivotally mounted to the tank adjacent the recessed chamber, means for biasing the lid to cover the recessed chamber, and means for maintaining the lid in an operation position so that the recessed chamber is uncovered during normal use. The means for maintaining the lid in an open position also includes means releasable to close the lid upon disturbance of the tank. The means for biasing the lid to cover the recessed chamber preferably includes spring means connected between the lid and the top wall of the fuel tank, whereas the means for maintaining the lid in an open position comprises means pivotally mounted to the tank and positionable below the bottom wall thereof, the lid being connected to the pivotally mounted means. More particularly, the means pivotally mounted to the tank comprises a rod member including a longitudinal portion pivotally mounted to the tank on the top wall thereof, and a leg portion extending transversely from the longitudinal portion adjacent one of the end walls of the tank. The leg portion is of a length longer than the height of the one end wall of the tank and is movable from a position extending below the bottom wall to a position parallel to the top wall whereby the lid connected thereto will be closed by the force of the spring means. The lower edge of the lid is connected to the rod member along the longitudinal portion thereof as by welding, for example.

In accordance with other aspects of the present invention, the recessed chamber includes a bottom wall which is substantially parallel to and spaced from the bottom wall of the fuel tank. The burner means is fastened to the bottom wall of the recessed chamber and comprises at least one substantially cylindrical side wall rigidly connected to the bottom wall of the recessed chamber, porous plug means positioned within the cylindrical side wall for absorbing liquid fuel, and a screen positioned on top of the porous plug means. The bottom wall of the recessed chamber further comprises aperture means positioned under the porous plug means for permitting fluid communication between the plug means and the contents of the fuel tank. The top of the cylindrical side wall preferably rises no higher than the level of the top wall of the fuel tank, and the porous plug means preferably fills the cylindrical side wall to a height spaced just below the top of the side wall. A second substantially cylindrical side wall may be provided and is spaced from the first cylindrical side wall and includes its own porous plug means and screen, whereby the burner means includes two distinct but substantially identical burner units positioned in the recessed chamber.

BRIEF DESCRIPTION OF THE DRAWINGS

Various objects, features, and attendant advantages of the present invention will be more fully appreciated as the same becomes better understood from the following detailed description of the present invention when considered in connection with the accompanying drawings, in which:

FIG. 3 is a top view, partially broken, of the preferred embodiment illustrated in FIGS. 1 and 2;

FIG. 4 is a side sectional view of the preferred embodiment of the present invention illustrated in FIG. 1 and taken along line 4—4 thereof; and FIG. 5 is an enlarged, partially broken, cross sectional view illustrating the preferred embodiment of a burner unit of the present invention and taken along line 5—5 of FIG. 4.

DETAILED DESCRIPTION OF THE PREFERRED EMBODIMENT

Figure 1:
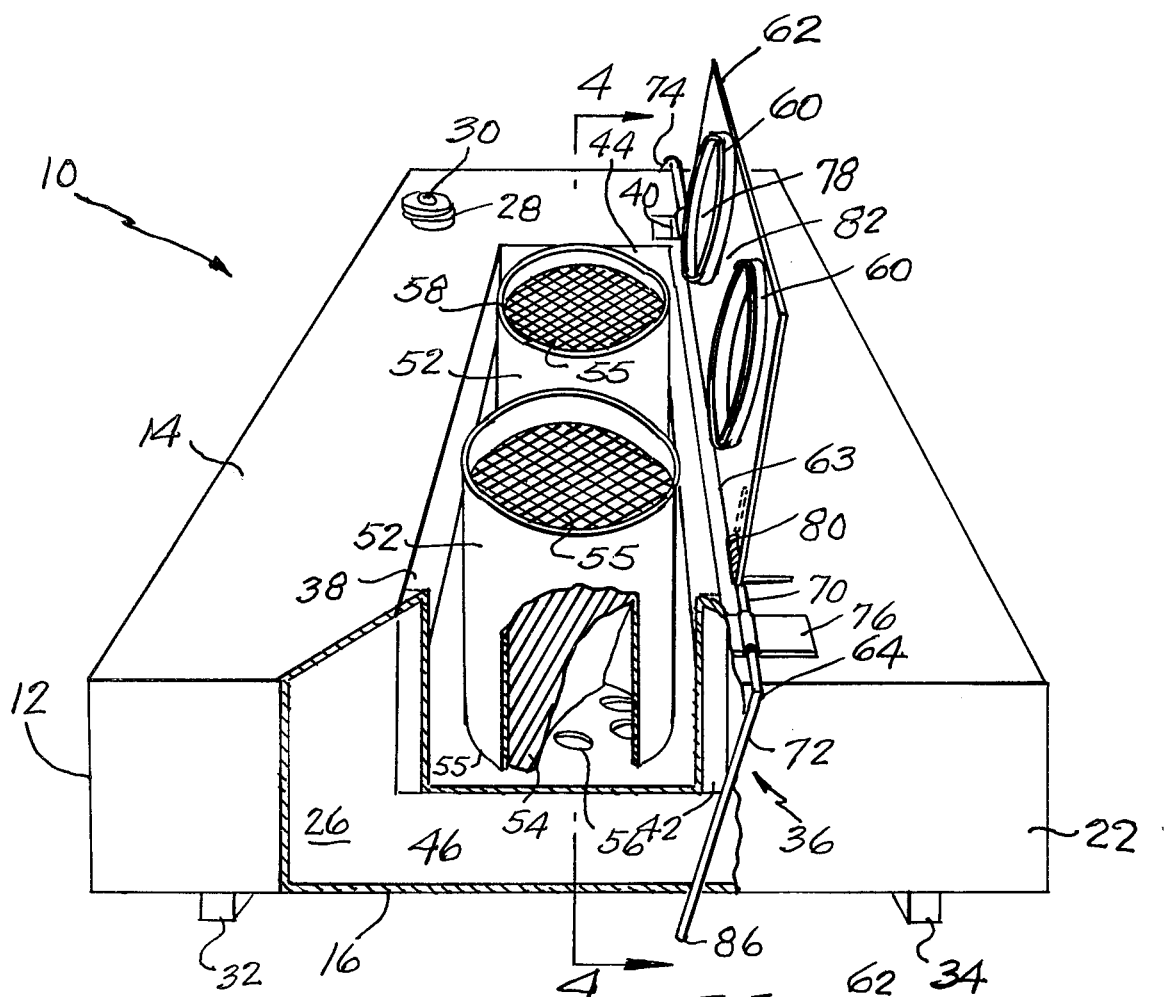
FIG. 1 is a perspective view, partially broken away, of a heat source assembly in accordance with a preferred embodiment of the present invention.

Referring now to the drawings, wherein like reference numerals indicate identical or corresponding parts throughout the several views, and more particularly to FIG. 1 thereof, a preferred embodiment of the heat source assembly of the present invention is indicated generally by reference numeral 10.

Heat source 10 is particularly designed and adapted to be placed underneath a food warming unit such as those generally utilized by a caterer in a buffet style food serving operation, although other uses of the heat source 10 will be apparent.

Heat source 10 comprises a tank or container 12 which has a generally rectangular configuration. Tank 12 includes a substantially planar top wall 14, bottom wall 16, side walls 18 and 20, and end walls 22 and 24. The walls of the tank 12 define a closed interior space 26 which is adapted to contain a considerable amount of liquid fuel, such as denatured alcohol or the like. The capacity of the tank 12 obviates the need for frequent replenishment of fuel so that the burner units, to be described in greater detail hereinafter, may be utilized for long periods of time without replacement or handling.

Access to the interior 26 of tank 12 is provided by means of a filler cap 28 which may have, for example, internal screws for securement about a threaded post 29. A vent 30 is preferbly formed in filler cap 28 for equalizing the pressure in the tank 12 with ambient. A collar 31 is also provided so that the tank 12 can be filled only to the bottom of collar 31, as a safety precaution.

Formed on the bottom wall 16 of the tank 12 are a plurality of legs 32 and 34 which are adapted to raise the heat source assembly 10 approximately one-half inch off the support surface upon which it is resting, such as a serving table or the like.

Formed centrally in the tank 12 is a somewhat rectangular recessed chamber which is indicated generally by reference numeral 36. Although recessed chamber 36 will be described hereinafter as being rectangular, it is clear to one or ordinary skill in the art that other shapes, such as oval, circular, square, etc., will serve the same purpose. The illustrated recessed chamber 36 includes longitudinal, parallel side walls 38 and 40 which are substantially parallel to the side walls 18 and 20 of the tank 12. Side walls 38 and 40 extend downwardly from the top wall 14 of tank 12 and are connected at their lower edges by a bottom wall 46 which is parallel to but spaced from the bottom wall 16 of tank 12. Extending between longitudinal side walls 38 and 40 at opposite ends of bottom wall 46 are a pair of parallel, transverse side walls 42 and 44, which are also parallel with the side walls 22 and 24 of tank 12.

The recessed chamber 36 is generally open at the top for accommodating a pair of burner units which are indicated generally by reference numerals 48 and 50. Each burner 48 and 50 can be of substantially the same construction, so that the same reference numerals are utilized with respect to each burner and description of the structure of one burner will suffice for the other.

For example, as illustrated most clearly in FIG. 5, burner 50 includes a substantially cylindrical side wall 52 which is connected as by welding 53 to the bottom wall 46 of the recessed chamber 36. Contained within most of the interior of the cylindrical side wall 52 is a porous plug 54 which may be of any suitable material that is absorptive of the liquid fuel contained within tank 12. In this regard, a plurality of apertures 56 are formed in the bottom wall 46 of recessed chamber 36 within the respective cylindrical side walls 52 to provide fluid communication between the liquid fuel contained in tank 12 and the porous plug 54.

The porous plug 54 is spaced downwardly from the top 55 of the cylindrical side wall 52 approximately, for example, one quarter of an inch. The top edge 55 of side wall 52 rises to a level no higher than that of top wall 14 of tank 12, for a purpose to be described in greater detail hereinafter. A circular wire screen 58 is positioned on top of porous plug 54.

An important safety feature of the heat source of the present invention is the provision of means for automatically extinguishing the burners 48 and 50 in the event of disturbance of the tank 12 to avoid spilling of the fuel and/or possible fire. The safety means preferably takes the form of a generally rectangular door 62 which is sized so as to be able to cover the opening of the recessed chamber 36. Connected to rectangular door or lid 62 as by welding along its lower edge 63 is a U-shaped rod 64 which is mounted alongside and parallel to one of the longitudinal side walls, such as side wall 40, of recessed chamber 36. U-shaped rod 64 includes a longitudinal portion 70 and a pair of leg portions 72 and 74 which extend transversely from the longitudinal portion 70 adjacent the end walls 22 and 24 of tank 12. Each leg portion 72 and 74 is longer than the height of end walls 22 and 24, for reasons which will become more clear hereinafter.

A pair of cylindrical sleeves 60 are attached to the inside wall 66 of door or lid 62 and are each sized somewhat larger than the diameters of tops 55 of burners 48 and 50. The rod 64 is mounted on the top wall 14 of tank 12 in such a manner so that when lid 62 is closed, the sleeves 60 will readily cover the tops 55 of both burner units 48 and 50 and thereby serve as cap members.

The longitudinal portion 70 of rod 64 therefore serves as a pivot for lid 62 and is secured for rotation by a pair of sleeved brackets 76 and 78 which are respectively secured to the top wall 14 of container 12. Legs 72 and 74 of rod 64 may be thought of as handles for opening and closing lid 62. The lid 62 is normally biased to be in its closed position, covering the burners 48 and 50, by means of a pair of springs 80 and 82 wrapped about portion 70 of rod 64 and connected between top wall 14 and the top surface 84 of cover 62.

However, lid 62 is, during use of the burners 48 and 50, retained in its open position by virtue of the bottom ends 86 of legs 72 and 74 contacting the support surface on which the tank 12 rests.

Figure 2:
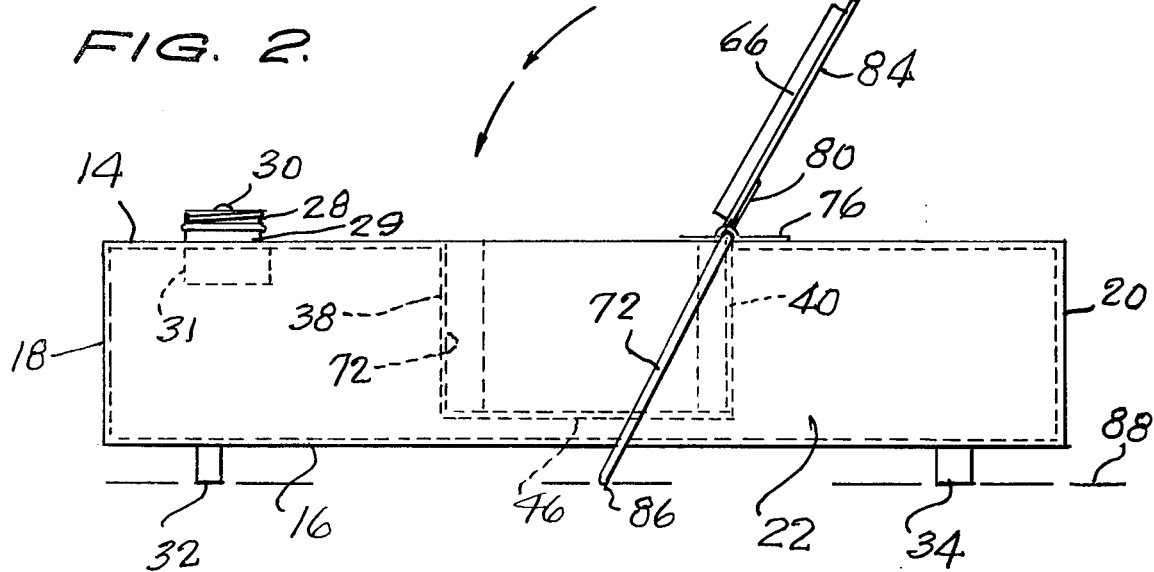
FIG. 2 is a side view of the preferred embodiment illustrated in FIG. 1.

In use, when it is desired to ignite the burners 48 and 50, lid 62 is pulled to its open position against the force of springs 80 and 82 and is maintained in the position illustrated in FIG. 2 by lifting one side of the tank 12 and rotating handles 72 and 74 until the ends 86 thereof contact the support surface 88. This action will also pivot lid 62 about rod 70 to its fully open position. Tank 12 is then lowered until both legs 32 and 34 recontact the support surface 88, thereby retaining U-shaped rod 64 in the position indicated in FIG. 2. The weight of tank 12 will maintain the U-shaped rod 64 in its door-opening retaining position.

If, however, the heat source assembly 10 is disturbed, as by being tipped over, dropped or lifted, the U-shaped rod 64 quickly rotates, under the force of springs 80 and 82, until the lid 62 connected thereto is fully rotated to its closed position, thereby extinguishing any flame emanating from burners 48 and 50.

Clearly, by virtue of the foregoing, I have provided a new and improved heat source which is particularly designed for use with portable, buffet style food warming units. The tank 12 is designed to hold a large quantity of liquid fuel, thereby avoiding and obviating the frequent fuel handling and replacement of canned heat sources prevalent in the prior art. The present invention does not rely upon throw away cans, thereby further reducing costs, both in material and fuel. The unit is easier and less messy to use than prior art devices, and provides safety features heretofore unavailable.

Obviously, numerous modifications and variations of the present invention are possible in light of the above teachings. It is therefore to be understood that within the scope of the appended claims, the invention may be practiced otherwise than as specifically described herein.

I claim as my invention:

1. A heat source for a food warming or similar unit, which comprises:

means for containing a liquid fuel;

burner means connected to said containing means and in communication with said liquid fuel; and means for automatically extinguishing said burner means upon disturbance of said containing means, wherein said containing means comprises a fuel tank including a top wall, a bottom wall, side walls, end walls and means providing access to the interior of said tank for filling same with liquid fuel, wherein said fuel tank further comprises a recessed chamber extending downwardly from the top wall thereof, said burner means being positioned in said recessed chamber, wherein said means for automatically extinguishing said burner means comprises a lid hingedly mounted to said tank adjacent said recessed chamber, means for biasing said lid to cover said recessed chamber, and means for maintaining said lid in an open position so that said recessed chamber is uncovered during normal use, wherein said means for maintaining said lid in an open position includes means releasable to close said lid upon disturbance of said tank, wherein said means for biasing said lid to cover said recessed chamber includes spring means connected between said lid and said top wall of said fuel tank, wherein said means for maintaining said lid in an open position comprises means pivotally mounted to said tank and positionable below said bottom wall thereof, said lid being connected to said pivotally mounted means, wherein said means pivotally mounted to said tank comprises a rod member including a longitudinal portion pivotally mounted to said tank on said top wall thereof and a leg portion extending transversely from said longitudinal portion adjacent one of said end walls, said leg portion being of a length longer than the height of said one end wall of said tank and movable from a position extending below said bottom wall to a position parallel to said top wall whereby said lid will be closed by the force of said spring means.

2. A heat source as set forth in claim 1, wherein the lower edge of said lid is connected to said rod member along said longitudinal portion thereof.

3. A heat source for a food warming or similar unit, which comprises:

means for containing a liquid fuel;

burner means connected to said containing means and in communication with said liquid fuel; and means for automatically extinguishing said burner means upon disturbance of said containing means, wherein said containing means comprises a fuel tank including a top wall, a bottom wall, side walls, end walls and means providing access to the interior of said tank for filling same with liquid fuel, wherein said fuel tank further comprises a recessed chamber extending domnwardly from the top wall thereof, said burner means being positioned in said recessed chamber, wherein said recessed chamber includes a bottom wall substantially parallel to and spaced from said bottom wall of said fuel tank, said burner means being fastened to said bottom wall of said recessed chamber.

4. A heat source as set forth in claim 3, wherein said burner means comprises at least one substantially cylindrical side wall rigidly connected to said bottom wall of said recessed chamber, porous plug means positioned within said cylindrical side wall for absorbing liquid fuel, and a screen positioned on top of said porous plug means.

5. A heat source as set forth in claim 4, wherein said bottom wall of said recessed chamber further comprises aperture means positioned under said porous plug means for permitting fluid communication between said plug means and the contents of said fuel tank.

6. A heat source as set forth in claim 4, wherein the top of said cylindrical side wall rises no higher than the level of said top wall of said fuel tank.

7. A heat source as set forth in claim 4, wherein said porous plug means fills said cylindrical side wall to a height spaced below the top of said side wall.

8. A heat source as set forth in claim 4, further comprising a second substantially cylindrical side wall spaced from said at least one side wall and including its own porous plug means and screen, whereby said burner means includes two distinct but substantially identical burner units positioned in said recessed chamber.

9. A heat source for a food warming unit, which comprises:
   fuel tank means for containing a liquid fuel and including burner means positioned therein in communication with said liquid fuel; and
   means for extinguishing said burner means upon disturbance of said fuel tank means, said extinguishing means including:
      a lid pivotally mounted to said tank means adjacent said burner means, a spring operatively coupled between said lid and said tank means for urging said lid to cover said burner means, and a rod member coupled to said lid so as to pivot therewith and including an integral leg portion extending along the side of said fuel tank means and adapted to contact the underlying support surface of said fuel tank means so as to maintain said lid in an open position during normal operation and to release said lid under the force of said spring upon disturbance of said tank means.

10. A heat source as set forth in claim 9, wherein said leg portion of said rod member is of a length longer than the height of said fuel tank means.

11. A heat source for a food warming unit, which comprises:
   fuel tank means for containing a liquid fuel and including recessed chamber means formed therein and having bottom wall means;
   a pair of burner units connected to said bottom wall means of said recessed chamber means, said bottom wall means including aperture means under said pair of burner units for maintaining communication with said liquid fuel in said fuel tank means; and
   means for extinguishing said pair of burner units upon disturbance of said fuel tank means.

12. A heat source as set forth in claim 11, wherein said extinguishing means includes:
   a lid pivotally mounted to said tank means adjacent said pair of burner units, a spring operatively coupled between said lid and said tank means for urging said lid to cover said pair of burner units, and a rod member coupled to said lid so as to pivot therewith and including an integral leg portion extending along the side of said fuel tank means and adapted to contact the underlying support surface of said fuel tank means so as to maintain said lid in an open position during normal operation and to release said lid under the force of said spring upon disturbance of said tank means.

13. A heat source as set forth in claim 12, wherein said leg portion of said rod member is of a length longer than the height of said fuel tank means.

* * * * *